United States Patent
Bartos

(10) Patent No.: US 10,215,308 B2
(45) Date of Patent: Feb. 26, 2019

(54) PIPE SECURING APPARATUS

(71) Applicant: Tomas Bartos, Elmhurst, IL (US)

(72) Inventor: Tomas Bartos, Elmhurst, IL (US)

(73) Assignee: HAP TECHNOLOGIES CO., Elmhurst, IL (US)

( * ) Notice: Subject to any disclaimer, the term of this patent is extended or adjusted under 35 U.S.C. 154(b) by 0 days.

(21) Appl. No.: 15/810,013

(22) Filed: Nov. 11, 2017

(65) Prior Publication Data

US 2018/0135779 A1    May 17, 2018

Related U.S. Application Data

(60) Provisional application No. 62/420,669, filed on Nov. 11, 2016.

(51) Int. Cl.
| | |
|---|---|
| *F16L 3/08* | (2006.01) |
| *F16L 3/04* | (2006.01) |
| *G01M 3/00* | (2006.01) |
| *F16L 3/22* | (2006.01) |
| *F16L 3/13* | (2006.01) |
| *G01K 13/00* | (2006.01) |

(52) U.S. Cl.
CPC ............. *F16L 3/04* (2013.01); *F16L 3/13* (2013.01); *F16L 3/221* (2013.01); *G01M 3/00* (2013.01); *G01K 13/00* (2013.01)

(58) Field of Classification Search
CPC ............ F16L 3/04; G01M 3/00; G01K 13/00
USPC ................. 248/62, 63, 71, 73, 74.2
See application file for complete search history.

(56) References Cited

U.S. PATENT DOCUMENTS

| | | | | | |
|---|---|---|---|---|---|
| 4,267,994 | A * | 5/1981 | Lynch | ............. | F16L 55/035 248/65 |
| 4,709,888 | A * | 12/1987 | Cubit | ............. | F16L 3/221 248/68.1 |
| 4,744,535 | A * | 5/1988 | Patenaude | ............. | F16L 3/1207 248/62 |
| 5,184,792 | A * | 2/1993 | Bernhard | ............. | H02G 3/26 248/71 |
| 5,688,428 | A * | 11/1997 | Maguire | ............. | E04G 21/185 249/219.1 |
| 7,073,761 | B2 * | 7/2006 | Diggle | ............. | H02G 3/30 248/304 |
| 8,033,511 | B2 * | 10/2011 | Grivas | ............. | F24F 1/0003 248/58 |

(Continued)

*Primary Examiner* — Gwendolyn W Baxter
(74) *Attorney, Agent, or Firm* — Justin Lampel

(57) ABSTRACT

A device for securing at least one pipe of a building is provided. The device has a first generally curved clamp which secures a first pipe and a first generally flat surface. The first generally flat surface may be secured directly to a stud of a wall or the device may not be secured to a stud and instead may be merely secured to the first pipe so that additional pipes may be secured to the first pipe. The first generally flat surface has an extended second generally flat surface having openings which may receive additional clamps for securing at least a second and/or a third pipe clamp. The second and/or third clamps may be located on the opposing side of the device as the first generally curved clamp. In an embodiment, the second and/or third generally curved clamps may rotate three hundred and sixty-five degrees so as to secure the second and/or third pipe in, for example, a parallel or perpendicular orientation with respect to the first pipe.

9 Claims, 7 Drawing Sheets

(56) References Cited

U.S. PATENT DOCUMENTS

| | | | | |
|---|---|---|---|---|
| 2001/0008265 A1* | 7/2001 | Hauer | ................... | F16L 3/1075 |
| | | | | 248/74.2 |
| 2002/0074475 A1* | 6/2002 | Nordvik | .................. | F16G 11/00 |
| | | | | 248/542 |
| 2015/0069190 A1* | 3/2015 | Bartos | ....................... | F16L 5/00 |
| | | | | 248/71 |

* cited by examiner

PIPE SECURING APPARATUS

CROSS-REFERENCE TO RELATED APPLICATIONS

The following application is based on and claims the priority benefit of U.S. provisional application Ser. No.: 62/420,669 filed Nov. 11, 2016 currently co-pending; the entire contents of which is incorporated by reference.

BACKGROUND OF THE INVENTION

A device for securing at least one pipe of a building is provided. The device has a first generally curved clamp which secures a first pipe and a first generally flat surface. The first generally flat surface may be secured directly to a stud of a wall or the device may not be secured to a stud and instead may be merely secured to the first pipe so that additional pipes may be secured to the first pipe. The first generally flat surface has an extended second generally flat surface having openings which may receive additional clamps for securing at least a second and/or a third pipe clamp. The second and/or third clamps may be located on the opposing side of the device as the first generally curved clamp. In an embodiment, the second and/or third generally curved clamps may rotate three hundred and sixty-five degrees so as to secure the second and/or third pipe in, for example, a parallel or perpendicular orientation with respect to the first pipe. An optional adjustor unit may be secured to at least the first generally curved clamp so that the device may secure various sized pipes. The device allows the pipe(s) to be secured within the building in compliance with governmental regulations. In an embodiment, the first clamp may almost completely surround the first pipe.

Attempts have been made to provide a pipe securing apparatus to secure a pipe within a wall of a building. For example, U.S. Pat. No.: 6,241,199 to Ismert discloses a protective insulating sleeve having a two-part construction with a pair of mating semi-cylindrical halves. Each semi-cylindrical half includes a semi-cylindrical metal sleeve surrounded by a semi-cylindrical plastic sleeve. The semi-cylindrical plastic sleeve has a groove formed in one exposed surface thereof and extending lengthwise along it. The semi-cylindrical metal sleeve extends outward past the semi-cylindrical plastic sleeve to form a tongue which mates with the groove in the other mating semi-cylindrical half such that the mated halves can be inserted into a bore in a stud or joist to receive a pipe or conduit extending through that stud or joist. Cushioning ribs are provided to dampen noise emanating from the pipe or conduit. The interlocked protective insulating sleeve thus serves the plural function of supporting and insulating the pipe or conduit and surrounding it with the metal sleeve to protect it from penetration by nails, screws or other fasteners driven into the stud or joist. The two part construction allows the protective insulating sleeve to be installed in a stud or joist before or after the pipe or conduit has been installed.

Further, U.S. Pat. No.: 5,488,198 to Kramer discloses a device for protecting wires and tubes which are placed thru the apertures in building panels or studs made of steel or the like. The protection device disclosed herein includes a single piece, plastic body having a wall surface which is bowed on opposing sides and flanged along its periphery. On opposing sides of the outer surface of the body's wall is arranged a single protruding ridge or a plurality of protruding, angled pins or male nubs which securely hold, in the gap formed between the wall flange and the ridge/male nubs, the opposing rims of an aperture in a metal stud that this device is designed to be securely attached to. The body of this device can be of any size or shape, including but not limited to square, rectangular, oval or cathedral shaped. Due to its elasticity and larger than aperture size, this device can be pinched in along the opposing bowed sides of the body's wall and upon release an outward pressure is achieved against the rims of the stud aperture. The design of the protruding male nubs in relation to the wall flange allows this device to remain firmly attached to the aperture once it is attached thereto.

Further, U.S. Pat. No.: 8,424,267 to Cannistraro, et al. discloses a protective device for use with a metal stud. This invention protects in-wall piping, conduit and wiring from inadvertent puncturing by drywall screws during the installation of wall boarding.

Still further, U.S. Pat. No.: 9,080,691 to the present applicant Bartos discloses a device for securing a pipe within the interior of a wall. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

However, these devices for securing a pipe within a building fail to provide device for securing multiple pipes which is easy to use, quick and inexpensive. Further, these devices fail to provide a pipe securing apparatus which easily complies with governmental regulations.

SUMMARY OF THE INVENTION

A device for securing at least one pipe of a building is provided. The device has a first generally curved clamp which secures a first pipe and a first generally flat surface. The first generally flat surface may be secured directly to a stud of a wall or the device may not be secured to a stud and instead may be merely secured to the first pipe so that additional pipes may be secured to the first pipe. The first generally flat surface has an extended second generally flat surface having openings which may receive additional clamps for securing at least a second and/or a third pipe clamp. The second and/or third clamps may be located on the opposing side of the device as the first generally curved clamp. In an embodiment, the second and/or third generally curved clamps may rotate three hundred and sixty-five degrees so as to secure the second and/or third pipe in, for example, a parallel or perpendicular orientation with respect to the first pipe. An optional adjustor unit may be secured to at least the first generally curved clamp so that the device may secure various sized pipes. The device allows the pipe(s) to be secured within the building in compliance with governmental regulations. In an embodiment, the first clamp may almost completely surround the first pipe.

An advantage of the present device is that the present device is easily secured to a pipe within a building.

An advantage of the present device is that the present device may be used to secure multiple pipes together without the need to secure the device to the stud of a wall.

And another advantage of the present pipe securing device is that the present device may secure multiple various-sized pipes in the same unit, including customized pipes for gas, water, waste, electrical, air vents, HVAC and the like.

In yet another embodiment, the device may have at least one sensor which detects problematic issues with, for example, water leaks, gas leaks, low or high temperatures, air flow problems, changes in humidity, etc.

An advantage of the present device is that the present device may allow pipes to be secured within a building in a vertical or horizontal manner.

Still a further advantage of the device is that the present device is light-weight and easy to install, often without the need of any tools.

And yet another advantage of the present device is that the present device may be used to secure pipes of various sizes.

A further advantage of the present device is that the present device may secure a pipe within a wall with no or few nails, screws, bolts, etc.

Yet another advantage of the present device is that the present device may allow for easy compliance with governmental regulations.

For a more complete understanding of the above listed features and advantages of the present pipe securing device reference should be made to the following detailed description of the preferred embodiments. Further, additional features and advantages of the invention are described in, and will be apparent from, the detailed description of the preferred embodiments.

DETAILED DESCRIPTION OF THE PREFERRED EMBODIMENTS

A device for securing at least one pipe of a building is provided. The device has a first generally curved clamp which secures a first pipe and a first generally flat surface. The first generally flat surface may be secured directly to a stud of a wall or the device may not be secured to a stud and instead may be merely secured to the first pipe so that additional pipes may be secured to the first pipe. The first generally flat surface has an extended second generally flat surface having openings which may receive additional clamps for securing at least a second and/or a third pipe clamp. The second and/or third clamps may be located on the opposing side of the device as the first generally curved clamp. In an embodiment, the second and/or third generally curved clamps may rotate three hundred and sixty-five degrees so as to secure the second and/or third pipe in, for example, a parallel or perpendicular orientation with respect to the first pipe. An optional adjustor unit may be secured to at least the first generally curved clamp so that the device may secure various sized pipes. The device allows the pipe(s) to be secured within the building in compliance with governmental regulations. In an embodiment, the first clamp may almost completely surround the first pipe.

Figures 1, 2:
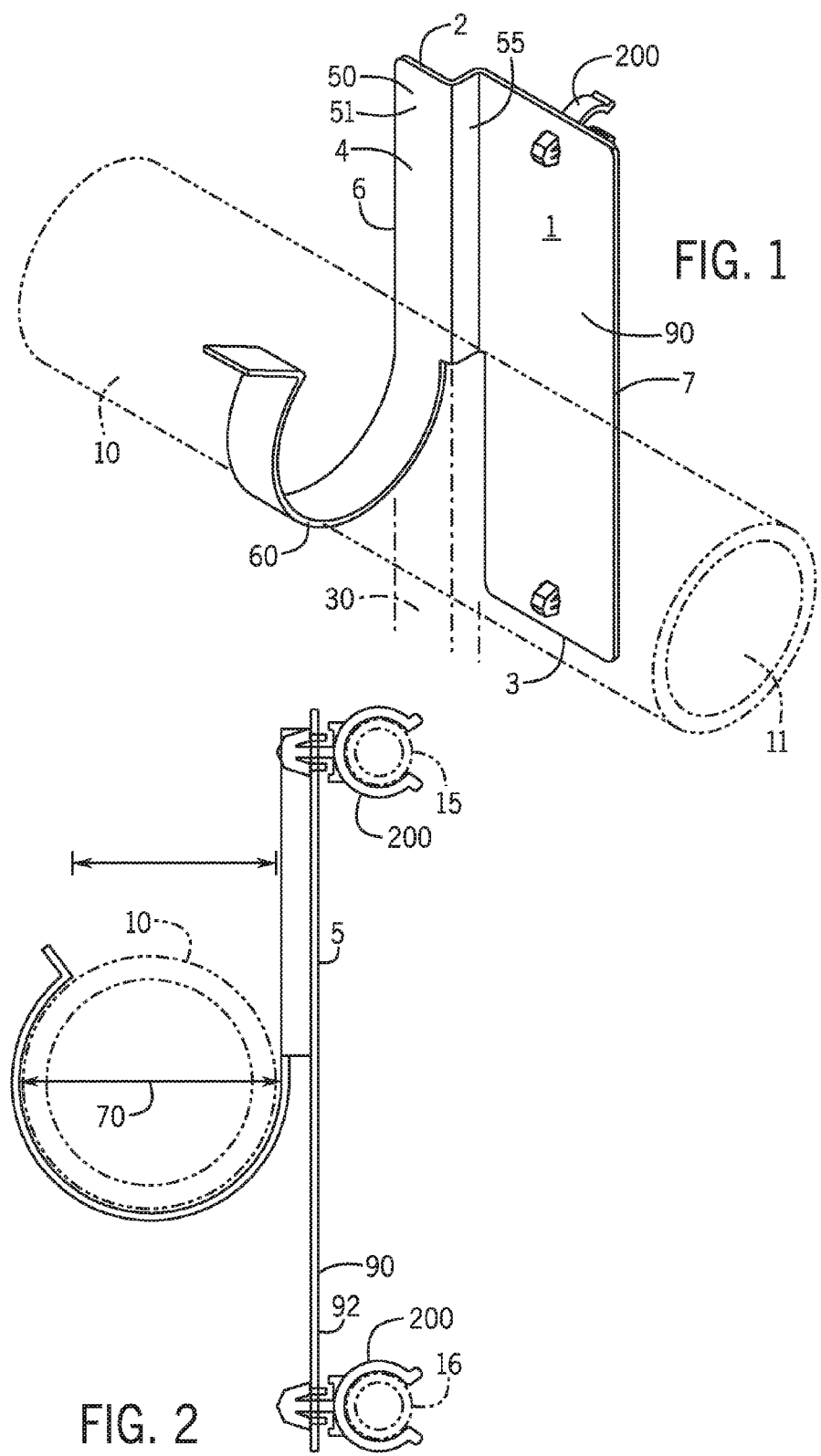
FIG. 1 illustrates a front perspective view of the device for securing a pipe wherein the outline of a pipe is shown.
FIG. 2 illustrates a side view of the device for securing a pipe wherein the outlines of three secured pipes are shown.

Referring first to FIGS. 1 and 2, a pipe securing device 1 is provided. Preferably, the pipe securing device 1 is made of a non-corrosive metal, but in an embodiment, may be made out of various other materials, including plastic. The device 1 may have a top 2, a bottom 3, a front 4, a back 5, a first side 6 and a second side 7. The device 1 may be especially suitable for securing a pipe 10 which may be located within the interior of a wall or may be free standing. In particular, the device 1 may secure at least a first pipe 10 to a stud 30 of a wall in one embodiment of use. In an embodiment, the device 1 may be utilized to secure a second pipe 15 and, in an embodiment, a third pipe 16. The pipe 10 may have an opening 11 for transporting, for example, a liquid, a gas, waste or wires.

Figure 9:
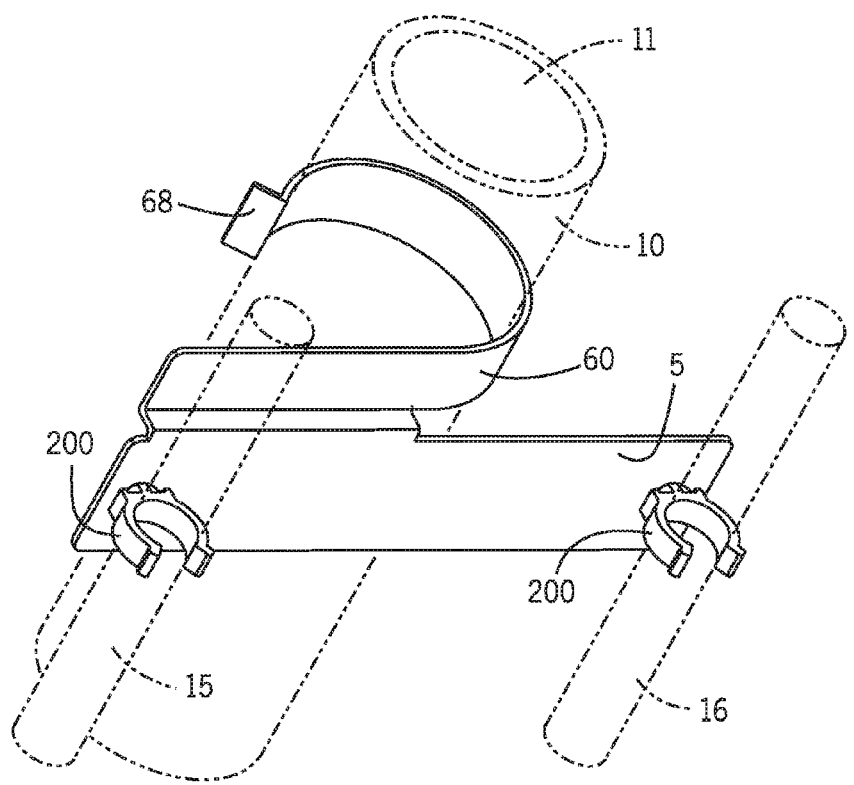
FIG. 9 illustrates a perspective view of the device for securing a pipe wherein the device is used without the need to secure the device to a stud and wherein the device is securing a second and third pipe in a parallel manner with respect to the first pipe.

In an embodiment, a system which includes the device 1 used in connection with the stud 30 of a building is provided wherein the system allows for the device to easily and properly secure at least one pipe within the wall of a building. In an embodiment, the device 1 is magnetic and may be magnetically attracted to the pipe 10 or building components so as to better secure the pipe 10. Although most of the figures illustrate the device 1 inserted on the first pipe 10 when the first pipe 10 is in a horizontal orientation, the device 1 may alternatively be secured to the first pipe 10 when the first pipe 10 is in a vertical orientation (FIG. 9).

Figure 5:
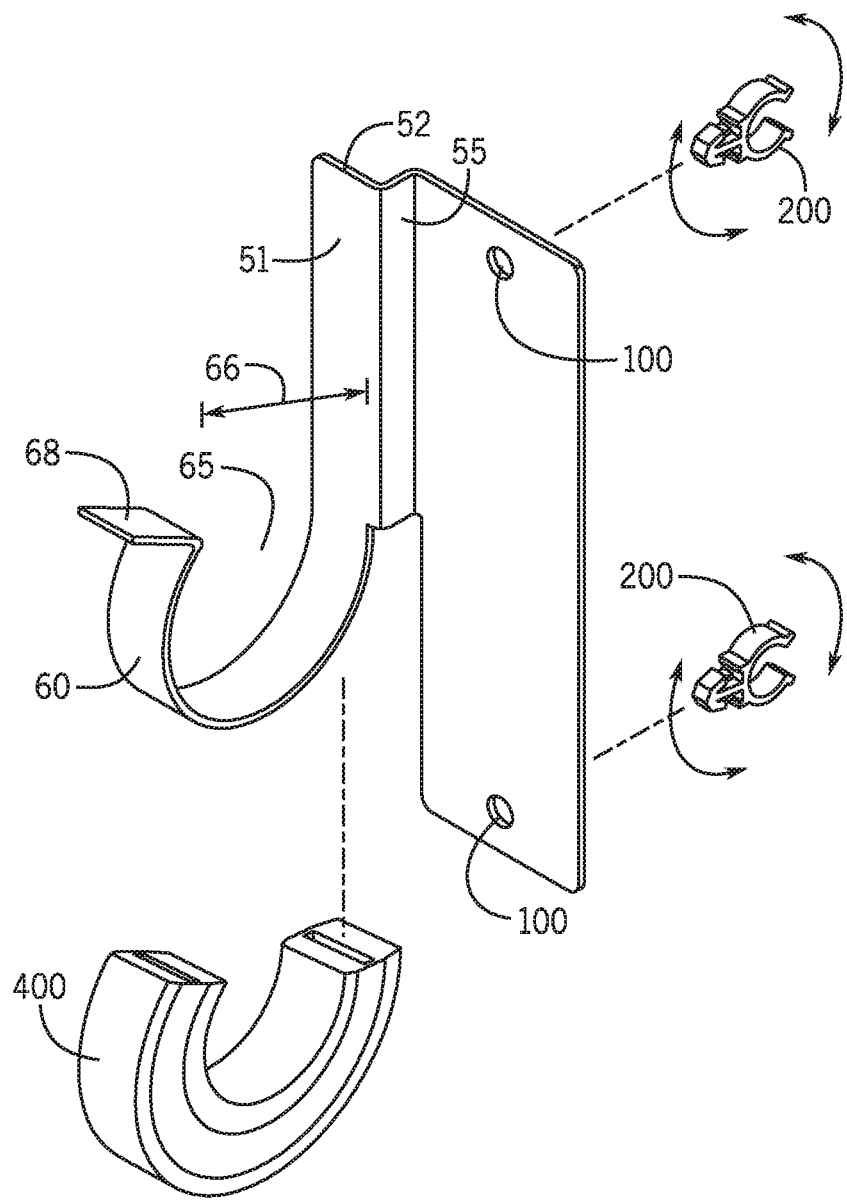
FIG. 5 illustrates an exploded view of the device for securing a pipe.
Figure 6:
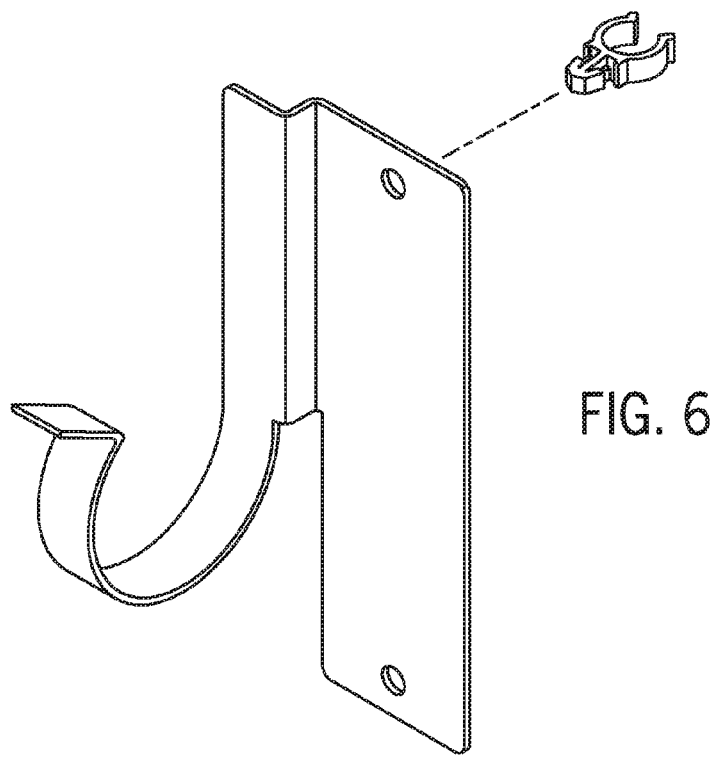
FIG. 6 illustrates an exploded view of the device for securing a pipe wherein the second clamp is rotated so that the first pipe and the second pipe are secured to the device in a non-parallel orientation.
Figure 7:
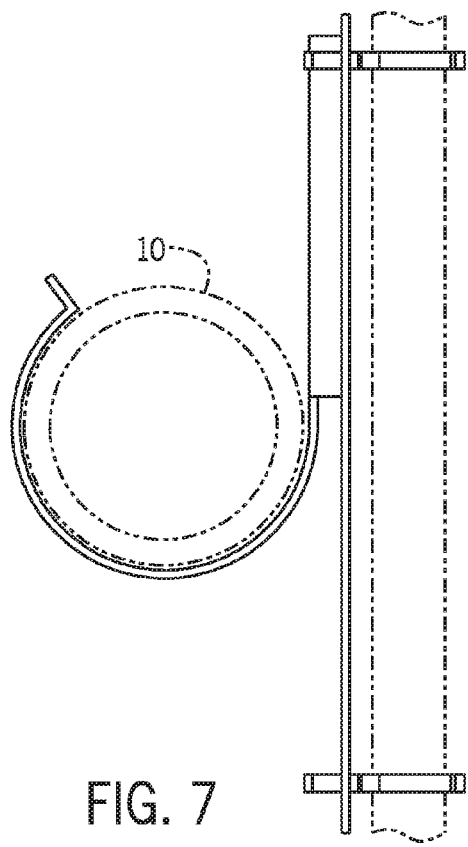
FIG. 7 illustrates a side view of the device for securing a pipe wherein the second and third clamps are rotated so that the first pipe and a second pipe are secured in a non-parallel orientation.

In an embodiment, the device 1 may have a first generally flat surface 50 and at least a first securing clamp 60. The first securing clamp 60 may slightly bend and may have spring tension or the first securing clamp 60 may be solid and inflexible. The first generally flat surface 50 may have a front 51 and a back 52 (FIG. 5). The first securing clamp 60 may be integrally formed with the first generally flat surface 50. The first securing clamp 60 may be generally curved having an opening gap 65 (FIG. 5) for receiving the first pipe 10. The opening gap 65 may have a diameter 66 which is generally slightly smaller than the diameter 70 (FIG. 2) of the pipe 10 so that the first securing clamp 60 may be manually pulled slightly backward (away from the first generally flat surface 50) and the pipe 10 inserted into the first securing clamp 60. In particular, the first securing clamp 60 may be manually pulled back by, for example, an optional tab 68 (FIG. 5) located at the end of the first securing clamp

60. Once the pipe 10 is secured within the gap 65 of the first securing clamp 60, the tension is released and the first securing clamp 60 therein secures the first pipe 10. In the embodiment wherein the first securing clamp 60 is inflexible, the pipe 10 may be merely slid through the opening gap 65 from the side of the device 1, therein eliminating the need to slightly bend the clamp 60.

Figure 3:
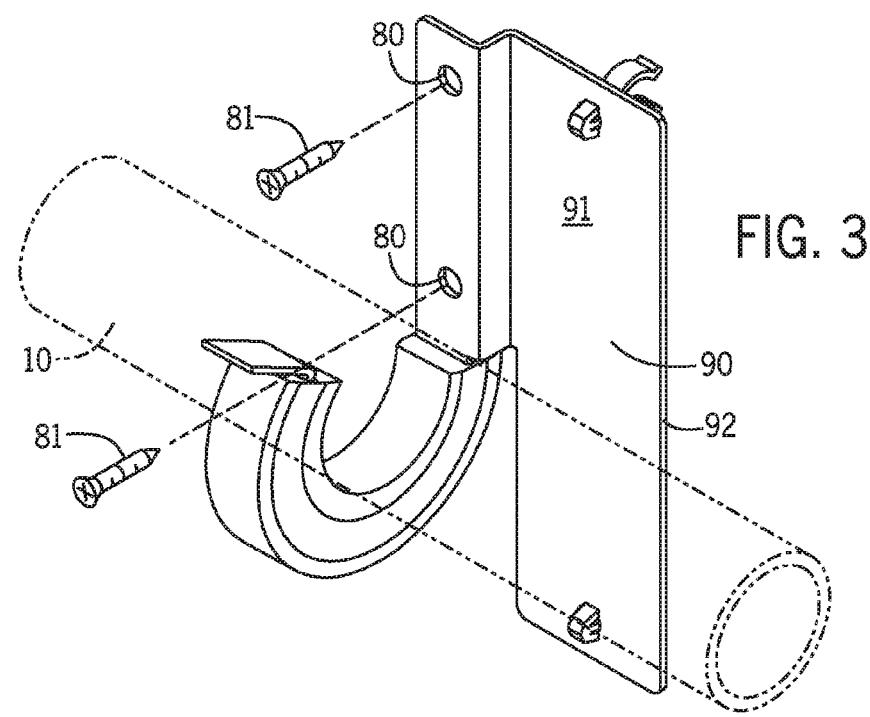
FIG. 3 illustrates a front perspective view of the device for securing a pipe wherein the outline of a pipe is shown and wherein the optional adjustor unit is utilized for a smaller pipe.

Extending from one of the sides of the first generally flat surface 50 may be a perpendicularly extended ridge 55. The perpendicularly extended ridge 55 and the back 52 of the first generally flat surface 50 may together be secured to the stud 30 of the wall in the embodiment wherein a stud 30 is utilized (FIG. 1). More specifically, the perpendicularly extended ridge 55 and the back 52 of the first generally flat surface 50 may cover a corner of the stud 30 when the device 1 is secured to a stud 30. In an embodiment, openings 80 (FIG. 3) on the first generally flat surface 50 may receive a securing device 81 (such as a screw or nail) to secure the device 1 to the stud 30 of the wall.

Attached to the perpendicularly extended ridge 55 may be a second generally flat surface 90 wherein the second generally flat surface 90 is not on the same plane as the first generally flat surface 50. The second generally flat surface 90 may be off set from the first generally flat surface 50 for better stability when attached to a stud 30 or, if a stud 30 is not used, so as to separate the pipes 10, 15, 16 from each other for better access. The second generally flat surface 90 may have a front 91 and a back 92 wherein the front 51 of the first generally flat surface 50 is parallel to the front 91 of the second generally flat surface 90. In an embodiment, the second generally flat surface 90 may be larger than the first generally flat surface 50 in both length and width. The greater size of the second generally flat surface 90 may be needed to allow the second and/or third pipes 15, 16 to be located away from the first pipe 10 and/or the stud 30 so that access to the second and/or third pipe 15, 16 is possible for maintenance and repair.

The second generally flat surface 90 may have openings 100 (FIG. 5) which may receive rotatable clamps 200. The figures illustrate two openings 100, although a greater or a fewer number of openings 100 may be utilized. The clamps 200 may have a generally circular-shaped back end 201 having an opening 202 for receiving the second and/or third pipe 15, 16 and a front end 204. In one embodiment, the opening 202 may slightly be expanded for receiving the pipe 15, 16 and may then be returned to its relaxed state wherein the pipe 15, 16 is secured by, for example, friction. Alternatively, the rotatable clamps 200 may be inflexible and the second pipe 15 and/or third pipe 16 may be slid into the clamps 200 from the side.

In an embodiment, the back end 201 of the clamps 200 may have tabs 203 for allowing a user to more easily expanding the size of the opening 202 for inserting or removing the second and/or third pipe 15, 16. It should be noted that the illustrations show the second and third clamps 200 as smaller than the first clamp 60 of the first flat surface 50; however, the sizes of all the clamps 60, 200 may be varied or identical. Although not shown in the drawings, the second and third pipe clamps 200 may be secured to the openings 100 of the second generally flat surface 90 on the same side of the device 1 as the first clamp 60. Even further, the second pipe clamp 200 and the third pipe clamp 200 may be secured to the openings 100 of the second generally flat surface 90 on opposing sides of the second generally flat surface 90 depending on the needs of the user.

The front end 204 of the clamps 200 may be inserted into the openings 100 of the second generally flat surface 90 and may be secured by spring tension anchors 210 of the clamps 200. In an embodiment, the clamps 200 may rotate three hundred and sixty-five degrees so that a user may secure the second and/or third pipe 15, 16 in any orientation, including a parallel orientation with respect to the first pipe 10 or in a perpendicular orientation with respect to the first pipe 10. Still further, a user may secure a pipe 15, 16 on an angle (as may be required in some rare cases) by rotating the clamps 200 accordingly.

Figure 10:
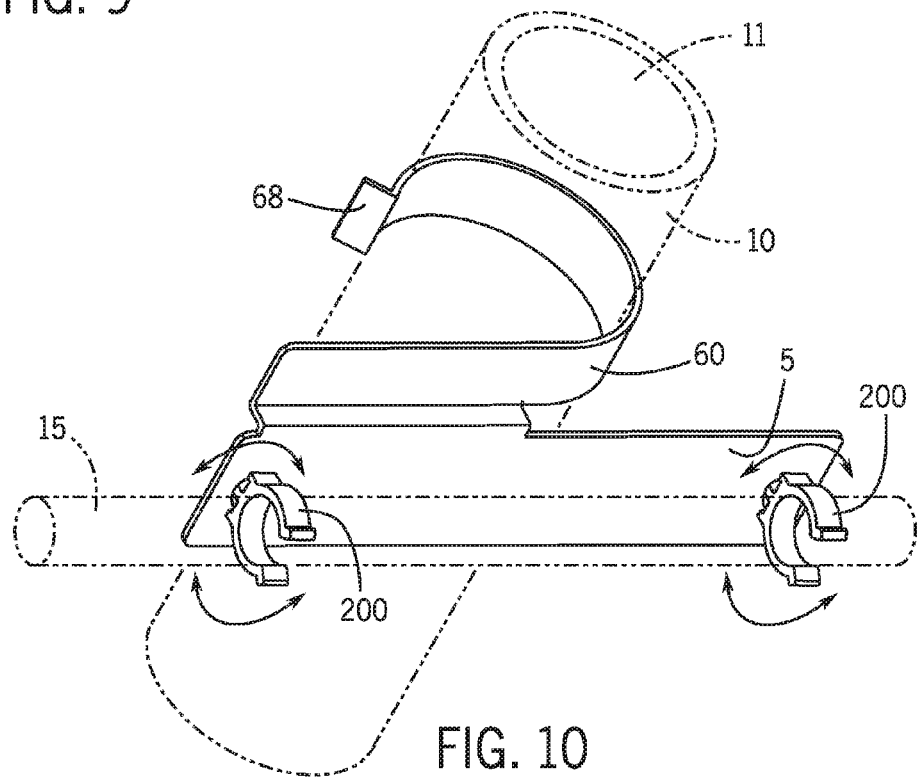
FIG. 10 illustrates a perspective view of the device for securing a pipe wherein the device is used without the need to secure the device to a stud and wherein the device is securing a second pipe in a perpendicular manner with respect to the first pipe.

The first pipe 10 may be secured on the front 4 of the device 1 whereas the second and/or third pipe 15, 16 may be secured to the back 5 of the device 1. The device 1 may be utilized without securing a second and/or third pipe 15, 16 or the device 1 may be utilized without securing the first pipe 10. If the user elects to use the clamps 200 in a "horizontal orientation" as illustrated in FIGS. 1-4, then a user may use the top and the bottom (or both clamps) 200 to secure two different pipes (the second and/or third pipe 15, 16). In this orientation, all the pipes 10, 15, 16 secured by the device 1 will generally be in a parallel orientation. If this orientation is used, a user may need to drill holes in the stud 30 to allow the second and/or third pipe 15, 16 to pass through the stud 30 if the device 1 is used in connection with a stud 30 (FIG. 1). Drilling holes would not be necessary if the device 1 is used without being secured to a stud 30 as is shown in FIGS. 9 and 10.

If a user rotates the second and third clamps 200 ninety degrees from FIG. 1, then a user may have the first pipe 10 secured parallel to the ground while a second pipe 15 is secured vertical with respect to the ground (and thus perpendicular to the first pipe 10). In this orientation, a user can generally only secure one pipe (the second pipe 15, but not the third pipe 16) if the two openings 100 on the second generally flat surface 90 are located directly above one another as is shown in FIG. 1. A user may also elect to use both clamps 200 to secure a single pipe 15 for better stability of the single pipe 15.

Figure 8:
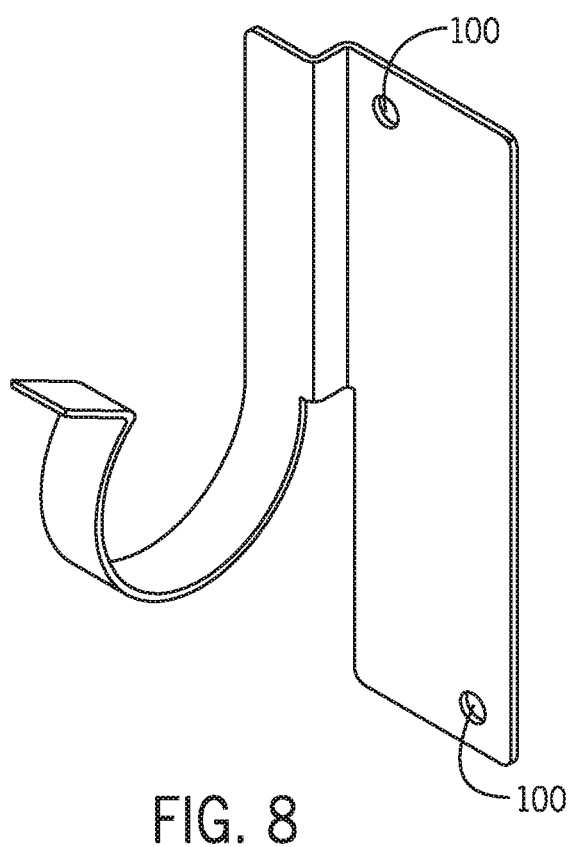
FIG. 8 illustrates a perspective view of the device for securing a pipe wherein the second and third openings for receiving the second and third clamps of the device are offset so as to allow two vertical pipes to be secured to the second generally flat surface.

In an alternative embodiment as shown in FIG. 8, if the opening 100 of the second generally flat surface 90 are offset, then a user may secure both a second pipe 15 and a third pipe 16 to the back 5 of the device 1. More specifically, in this embodiment, the top opening 100 may be located near, for example, the first generally flat surface 50 while the lower opening 100 may be located farther away from the first generally flat surface 50. As a result, if a user elects to secure a second pipe 15 and a third pipe 16 in a vertical position with respect to the ground, the second pipe 15 and third pipe 16 will each have room to be secured next to each other.

Figure 4:
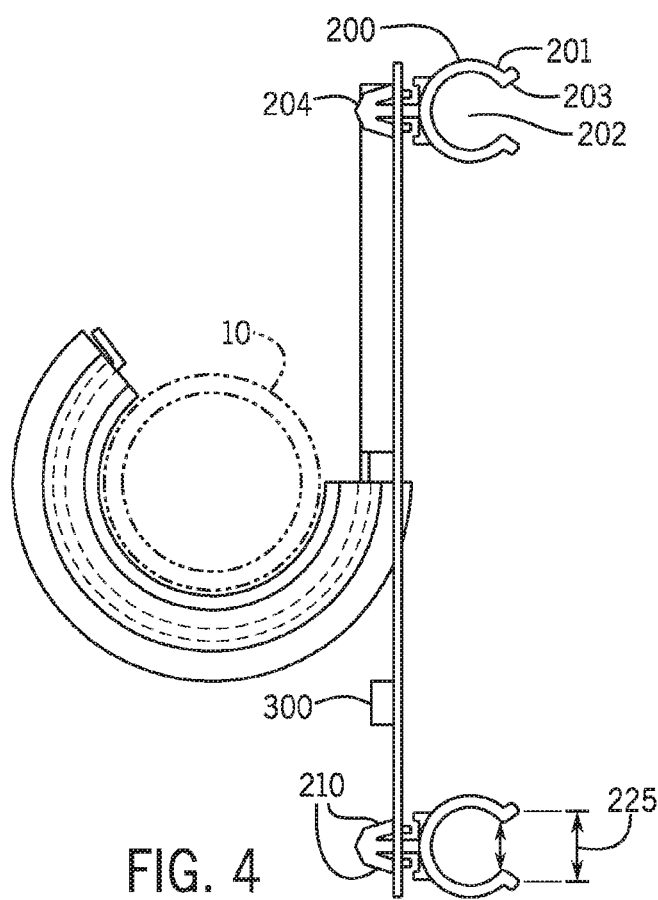
FIG. 4 illustrates a side view of the device for securing a pipe wherein the outline of a pipe is shown and wherein the optional adjustor unit is utilized for a smaller pipe.

Referring now to FIGS. 4 and 5, in an embodiment, the device 1 may a sensor 300 which may detect problematic issues with, for example, water leaks, gas leaks, low or high temperatures, air flow problems, changes in humidity, etc. Still further, in an embodiment, a generally curved-shaped adjustor piece 400 may be inserted onto the first securing clamp 60 so as to reduce the diameter of the gap 65 of the first clamp 60 and therein to allow a smaller pipe 10 to be secured in a solid and immovable manner. An optional adjustor piece 400 may also be used on the second and/or third camps 200 (although not shown in the drawings). In an embodiment, the optional adjustor piece 400 and the device 1 may both be magnetic so as to allow the optional adjustor piece 400 to more easily be secured to the first clamp 60.

Referring now to FIGS. 9 and 10, in an embodiment, the device 1 may be used to secure multiple pipes 10, 15 and 16 together without the need to secure the device 1 to the stud of a wall (as is shown in FIG. 1). More specifically, a user may first secure the device 1 partially around the first pipe 10. The device 1 may then be held in place by, for example, friction. Further, no tools may be required to secure the device 1 to the first pipe 10. An adhesive may be electively added as well to secure the device 1; although the adhesive is not necessary. Once the device 1 is aligned and secured to the first pipe 10, a second pipe 15 and third pipe 16 may be secured within the second and third clamps 200 of the device 1 on the opposing side of the device 1. FIG. 9 illustrates all the pipes in a parallel orientation. FIG. 10 illustrates the clamps 200 easily rotated so as to secure a second pipe 15 in a perpendicular orientation with respect to the first pipe 10. The second pipe 15 and/or third pipes 15, 16 may be, for example, water supply lines while the first pipe 10 may be, for example, waste and/or vent pipes.

Figure 11:
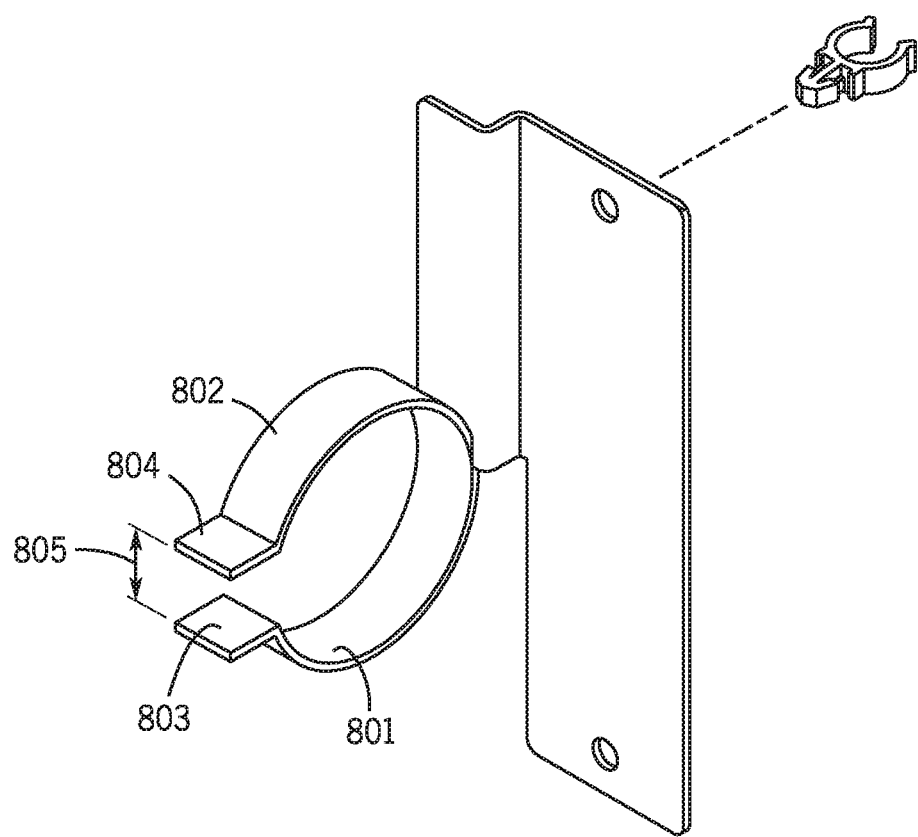
FIG. 11 illustrates an alternative embodiment of the device wherein the device has a top and a bottom clamp portion for securing the first pipe.

In an embodiment as illustrated in FIG. 11, the first clamp 60 of the device 1 may have a first unit 801 and a second unit 802 wherein the two units 801 and 802 together substantially surround the pipe 10. Tabs 803 and 804 of the device 1 in this embodiment may operate similar to the tabs 68 of the other embodiments; therein allowing a user to slightly expand a distance 805 to introduce the pipe 10 into the device 1. Alternatively, a pipe 10 may be slid in though the side of the clamp 60 of the device 1 without the need to expand the distance 805 of the clamp 60.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A Pipe securing device comprising:
   a first flat surface having a front having a length, a back, a first side, a second side, a top, and a bottom;
   a perpendicularly extended ridge extending from the first or second side of the first flat surface wherein the perpendicularly extended ridge is at a right angle with respect to the first flat surface;
   a first curved clamp located at the bottom of the first flat surface;
   a second generally flat surface secured at a right angle to the opposing side of the perpendicularly extended ridge as the first flat surface;
   wherein the first curved clamp of the first flat surface is capable of securing a pipe;
   a first opening on the second generally flat surface wherein the first opening of the second generally flat surface receives a second clamp and wherein the second clamp secures a second pipe; and
   wherein the second clamp is capable of rotating three hundred and sixty degrees and is capable of receiving and securing the second pipe at any angle with respect to the first pipe.

2. The pipe securing device of claim 1 further comprising:
   a second opening on the second generally flat surface wherein the second opening receives a third clamp and wherein the third clamp is capable of receiving a third pipe.

3. The pipe securing device of claim 2 wherein the second opening of the second generally flat surface is off set with respect to the first opening.

4. The pipe securing device of claim 1 wherein the device is magnetic.

5. The pipe securing device of claim 1 further comprising:
   an extended edge located at an end of the first clamp wherein the extended edge allows for the grasping and bending of the first clamp.

6. The pipe securing device of claim 1 further comprising:
   at least one opening on the first flat surface wherein the opening on the first flat surface is capable of receiving a securing device to secure the first flat surface to a stud of a wall.

7. The pipe securing device of claim 1 further comprising:
   a sensor attached to the first flat surface or the second flat surface wherein the sensor detects water leaks, gas leaks, temperatures, air flow or humidity levels.

8. The pipe securing device of claim 1 further comprising:
   an adjustor piece which temporarily and removably is secured to the first clamp and wherein the adjustor piece reduces a diameter of the first clamp and therein allows for a smaller first pipe to be secured in the first clamp.

9. The pipe securing device of claim 1 wherein the second clamp is located on the opposing side of the second general flat surface as the first curved clamp.

* * * * *